Feb. 17, 1925.

J. R. REPLOGLE 1,527,156

REFRIGERATED FOOD CABINET

Original Filed July 21, 1922    2 Sheets-Sheet 1

INVENTOR:
John R. Replogle
BY Ray N. Kerr
ATTORNEY.

Feb. 17, 1925.
J. R. REPLOGLE
1,527,156
REFRIGERATED FOOD CABINET
Original Filed July 21, 1922  2 Sheets-Sheet 2
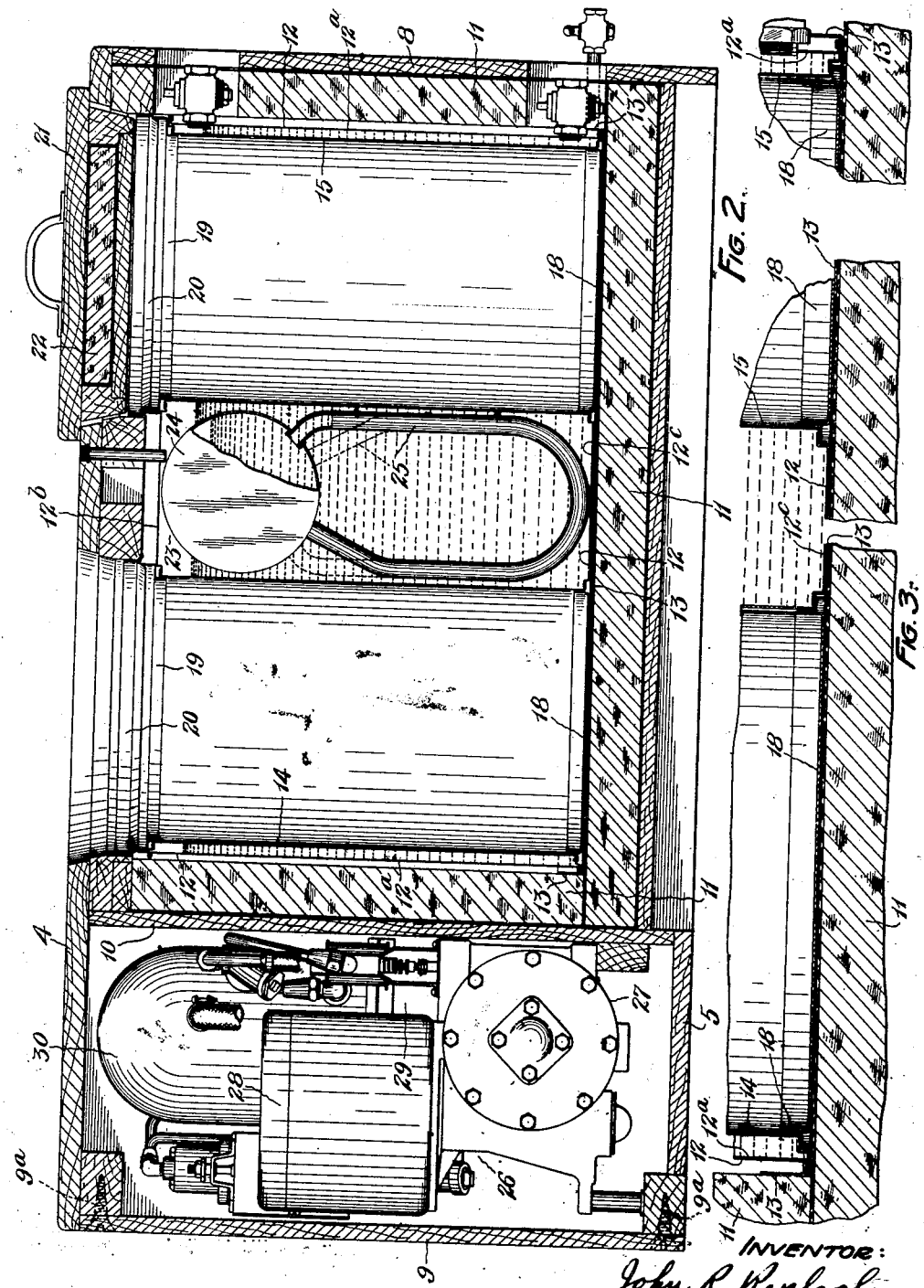
INVENTOR:
John R. Replogle
by Ray J. Uhr
ATTORNEY.

Patented Feb. 17, 1925.

1,527,156

UNITED STATES PATENT OFFICE.

JOHN R. REPLOGLE, OF DETROIT, MICHIGAN, ASSIGNOR TO NIZER LABORATORIES COMPANY, OF DETROIT, MICHIGAN, A CORPORATION OF MICHIGAN.

REFRIGERATED FOOD CABINET.

Original application filed July 21, 1922, Serial No. 576,477. Divided and this application filed November 8, 1923. Serial No. 673,399.

*To all whom it may concern:*

Be it known that I, JOHN R. REPLOGLE, a citizen of the United States, residing at Detroit, in the county of Wayne and State of Michigan, have invented certain new and useful Improvements in and Relating to Refrigerated Food Cabinets, of which the following is a specification, reference being made therein to the accompanying drawings.

The invention relates to refrigerating cabinets for food and the like and particularly to a form of food cabinet having a brine tank with one or more food chambers disposed therein so as to be surrounded and cooled by the brine, the present application being a division of my co-pending application Serial No. 576,477, filed July 21, 1922, upon which has been granted Letters Patent No. 1,476,546.

The chief object of the invention is to so construct the walls of the cabinet casing, the brine tank and the food chamber or chambers that stresses incident to the reception in the food chambers of food or food containers are principally sustained by the casing structure and not by the brine tank and food chamber structure.

A further object is to provide, in a structure such as last referred to, means to prevent access of liquid to the heat-insulating walls of the casing, incident to defrosting of the cold walls of the food chambers, or the like.

Other objects that are incident or ancillary to those above mentioned will appear in the following description which sets forth a preferred embodiment of the invention.

In the drawings, Fig. 1 is a plan view of my improved cabinet with some of the parts broken away and some shown in section.

Fig. 2 is a vertical section on the broken line 2—2, Fig. 1.

Fig. 3 is an enlarged fragmentary section on the same plane as Fig. 2, parts being broken away to permit illustration on the large scale.

Figure 1:
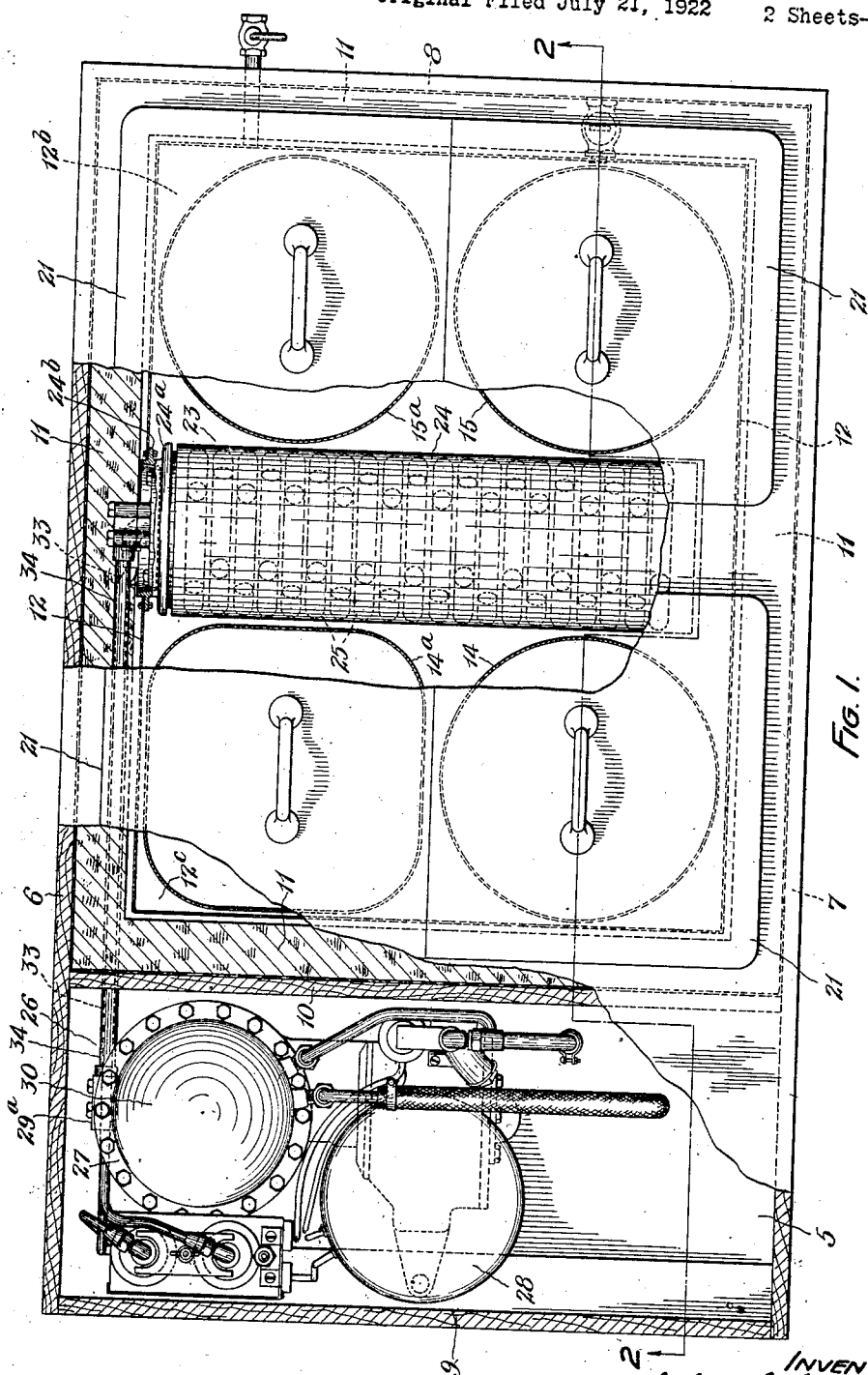

Referring in detail to the construction illustrated, the cabinet comprises a unitary frame with top and bottom walls 4 and 5, side walls 6 and 7, end walls 8 and 9 and a vertical partition 10 which divides the cabinet into two compartments. One of the exterior lateral walls of the smaller compartment, preferably the end wall 9 is in the form of a removable panel secured by screws 9ª, or the like.

The larger of the two compartments of the cabinet has its bottom, side and end walls lined with heat-insulating material 11. This insulating material may be of any suitable character but I have found cork board most satisfactory. The cork boards 11 constitute in effect part of the walls of the cabinet. Within these heat-insulating walls is arranged a sheet metal brine tank 12 which preferably rests upon a shallow sheet metal pan 13 which is supported by the bottom insulation 11. The tank 12 has vertical side and end walls 12ª and top and bottom walls 12ᵇ, 12ᶜ. The top and bottom walls are apertured to receive the ends of two pairs of vertical sleeves 14, 14ª and 15, 15ª, the ends of the sleeves being connected to the said tank walls with liquid-tight joints. It is essential that the bottom walls be liquid-tight in order to hold the brine. While an important function of the joints at the tops of the sleeves is to brace the latter, I prefer that the top joints as well as the bottom one should be liquid-tight in order to obviate leakage of brine in case the latter is splashed in moving the cabinet. As shown, the sleeves 14, 15, 15ª are cylindrical while the sleeve 14ª has straight sides with rounded corners. The vertical sleeves are designed to form chambers or receptacles to receive cans of bulk ice cream, say five-gallon cans, or at least the sleeves 14, 15, 15ª are so designed. The flat-sided sleeve 14ª is so made to better accommodate brick ice cream. To take the impact and sustain the weight of the heavy cans of ice cream lowered into the sleeves each of them is preferably provided at its lower end with a relatively heavy sheet metal pan 18 which rests upon the pan 13. Since the pan 13 in turn rests upon the bottom wall of the cabinet, said wall in reality bears the weight of the ice cream and containers in the food chambers and consequently the walls of the brine tank and the joints thereof are relieved of such stresses as would result from the impact and the weight of the heavy cans of ice cream and there is no tendency to open up the liquid-tight joints of the tank.

The top wall 4 of the cabinet is formed with apertures that register with the several sleeves and each sleeve is fitted at its upper end with guiding or protecting thimbles 19, 20. Each of the top wall apertures of the cabinet is fitted with a cover 21 which is preferably provided with a lower heat-insulating material 22 of cork board, or the like.

The tank 12 is filled with brine preferably to a level somewhat below the top wall 12$^b$ of said tank so that a major part of the sleeves 14, 14$^a$ and 15, 15$^a$ are immersed in or surrounded by the brine. It may be noted here that while, for the sake of brevity and convenience, I employ the term "brine" throughout this application any suitable one of the known anti-freezing solutions or liquids can be used, and the term "brine" should be read in a correspondingly broad and comprehensive sense. In so far as the present invention is concerned the brine in the tank 12 can be cooled by any suitable means. In the construction illustrated the pair of sleeves 14, 14$^a$ are spaced from the pair of sleeves 15, 15$^a$ to provide room for an evaporator or vaporizer designated in its entirety by 23. This evaporator is like that of the refrigeration apparatus disclosed in my pending U. S. application Serial No. 475,344, filed June 6, 1921, and Letters Patent of France No. 547,971, to which reference may be had for a detailed showing and description of the evaporator, and also of the compressor-condenser mechanism which is associated with it. For the purpose of the present invention it is sufficient to note that the evaporator comprises a header 24 and a series of depending pipe loops or circulating tubes 25, the major part of the evaporator being submerged in the brine. One end of the header 24 is formed by the head casting 24$^a$ having a flange 24$^b$ which is connected with a liquid-tight joint to the adjacent side wall of the tank 12 at the periphery of an aperture through said wall by bolts or rivets, as shown in Fig. 1.

The compressor and condenser mechanism, which is designated in its entirety by 26, is mounted in the smaller compartment of the cabinet. This mechanism comprises a compressor 27 of the reciprocating piston type the crank shaft of which is driven by an electric motor 28 having its armature shaft arranged vertically to drive the crank shaft of the compressor through suitable worm gearing. On the flanged top of the crank case 29 of the compressor is mounted a condenser dome 30 within which are disposed water-cooled coils (not shown). The interior of the condenser dome 30 is connected by suitable conduits (not shown) to a tube 33 which connects with the head 24$^a$ of the vaporizer header, the passage way being controlled by a float-actuated valve disposed within the header as shown and described in my pending application, Serial No. 475,344, and my Letters Patent of France No. 547,971, above mentioned. The vapor space in the upper part of the header 24 is connected by a tube 34 with the interior of the crank case 29 through a hollow boss or attachment 29$^a$ on the side of said crank case. The compressor crank case, the condenser dome 30, vaporizer 23 with the connecting tubes 33 and 34 constitute a closed system into which is charged some suitable working medium, such as sulfur dioxide. When the compressor is operated by the motor 28 the sulfur dioxide gas is drawn from the crank case, compressed and discharged under pressure into the condenser 30 where it comes in contact with the water-cooled tubes and is liquefied. This liquefied refrigerant gas then flows through the tube 33 into the vaporizer 23 where it vaporizes and absorbs heat from the brine and thereafter in a gaseous state returns through the tube 34 to the crank case 29 of the compressor.

The compressor is automatically started and stopped by pressure controlled mechanism which actuates a switch to connect and disconnect the driving motor 28 and, preferably, an electro-magnetic valve which controls the flow of water through the condenser. As any suitable control mechanism may be employed in so far as my present invention is concerned that indicated in the drawings need not be further referred to. For a full disclosure and description of the mechanism reference may be had to my aforesaid copending applications Serial Nos. 576,477 and 475,344, and to the aforesaid French Patent No. 547,971.

A refrigerated ice cream cabinet constructed and fitted as described is capable of maintaining its food chambers at uniformly low temperatures for indefinite periods with minimum attention. As soon as the temperature of the brine surrounding the food chambers rises above a certain point the pressure in the vaporizer header 24 starts the motor of the compressor and this withdraws the vaporized gas in the vaporizer and compresses and liquefies it, and the lowering of the pressure in the vaporizer immediately increases the rate of vaporization therein with the resultant lowering of the temperature. As soon as the temperature, and consequently the pressure in the header 24, falls to a certain point the compressor motor is automatically disconnected and the compressor stopped.

In the operation of the cabinet, the walls of the food chambers become frosted as a result of the freezing of atmospheric moisture deposited thereon and in case the use or operation of the cabinet is discontinued the liquid formed by the melted frost runs to the bottom of the food chambers. The pan 13 underlying the tank serves to catch and hold this liquid, as well as any small amounts of ice cream or the like which may be split in the food chambers, and prevents the liquid from contacting with the heat-insulating bottom wall of the cabinet and causing deterioration thereof.

While I have shown and described the preferred embodiment of my invention, it will be understood that there can be wide variation from the construction disclosed without departing from the invention, the scope of the invention being defined in the appended claims.

What I claim is:—

1. In a refrigerated cabinet, the combination of a frame and casing structure formed with top, bottom and side walls and with an opening in its top wall to receive food and the like; and a brine tank disposed in said casing structure and supported on the bottom wall thereof, said tank comprising bottom and side walls of sheet metal and an upright imperforate metal sleeve connected at its lower end to the edges of a correspondingly shaped opening in the bottom wall of the tank so as to form a chamber for food and the like registering with the opening in the top wall of the casing; whereby the weight and impact of food or the like introduced into said chamber to be cooled by the surrounding brine is sustained by the bottom wall of the casing structure and not by the tank.

2. In a refrigerated cabinet, the combination of a frame and casing structure formed with top, bottom and side walls and with an opening in its top wall to receive food or the like, and a brine tank disposed in said casing structure and supported on the bottom wall thereof, said tank having top, bottom and side walls of sheet metal and an upright sheet metal sleeve connected at its upper and lower ends to the edges of correspondingly shaped openings in the top and bottom walls of the tank so as to form a chamber for food or the like registering with the opening in the top wall of the casing; whereby the weight and impact of food or the like introduced into said chamber to be cooled by the surrounding brine is sustained by the bottom wall of the casing structure and not by the tank.

3. In a refrigerated cabinet, the combination of a frame and casing structure, formed with top, bottom and side walls and with an opening in its top wall to receive food or the like, and a brine tank disposed in said casing structure and supported on the bottom wall thereof, said tank having bottom and side walls of sheet metal and an upright sheet metal sleeve connected at its lower end to the edge of a correspondingly shaped opening in the bottom wall of the tank so as to form a chamber for food or the like registering with the opening in the top wall of the casing; and a buffer plate resting on the bottom wall of the casing structure beneath said chamber; whereby the weight and impact of food or the like introduced into said chamber to be cooled by the surrounding brine is sustained by the bottom wall of the casing structure and said buffer plate and not by the tank.

4. In a refrigerated cabinet, the combination of a frame and casing structure formed with top, bottom and side walls and with a plurality of openings in its top wall to receive food or the like, a brine tank disposed in said casing structure, said tank having bottom and side walls of sheet metal and a plurality of upright sheet metal sleeves connected at their lower ends to the edges of correspondingly shaped openings in the bottom wall of the tank so as to form a plurality of chambers for food and the like registering with the said openings in the top wall of the casing, a shallow metal pan underlying said tank and supported by the bottom wall of the casing and individual buffer plates in the bottoms of said food chambers supported by said metal pan; whereby the weight and impact of food or the like introduced into said chambers to be cooled is sustained by said metal plates and the bottom wall of the casing structure and not by the tank.

5. In a refrigerated cabinet, the combination of a frame and casing structure, formed with top, bottom and side walls and with an opening in its top wall to receive food or the like, and a brine tank disposed in said casing structure and supported on the bottom wall thereof, said tank having bottom and side walls of sheet metal and an upright sheet metal sleeve connected at its lower end to the edge of a correspondingly shaped opening in the bottom wall of the tank so as to form a chamber for food or the like registering with the opening in the top wall of the casing, and a shallow metal pan underlying said tank and supported by the bottom wall of the casing, said pan being adapted to catch and hold water resulting from the defrosting of the food chamber walls or other substances accidentally spilled in the food chamber.

In testimony whereof, I hereunto affix my signature.

JOHN R. REPLOGLE.